(12) United States Patent
Jones

(10) Patent No.: US 6,465,767 B2
(45) Date of Patent: Oct. 15, 2002

(54) PHOTOMULTIPLIER TUBE REPROCESSING

(75) Inventor: Marshall Gordon Jones, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 42 days.

(21) Appl. No.: 09/749,172

(22) Filed: Dec. 27, 2000

(65) Prior Publication Data

US 2002/0079426 A1 Jun. 27, 2002

(51) Int. Cl.[7] .............................. B23K 26/00
(52) U.S. Cl. .................. 250/207; 250/214 VT; 250/222.2; 313/532; 313/533; 219/121.67; 219/121.79; 219/121.83
(58) Field of Search .................. 250/207, 214 VT, 250/222.2; 313/532, 533; 356/438; 219/121.67, 121.79, 121.81, 121.83, 121.85

(56) References Cited

U.S. PATENT DOCUMENTS

| | | | | |
|---|---|---|---|---|
| 3,643,299 A | * | 2/1972 | Brown | 445/34 |
| 4,401,912 A | | 8/1983 | Martzloff et al. | 313/17 |
| 4,734,550 A | * | 3/1988 | Imamura et al. | 219/121.77 |
| 4,871,415 A | * | 10/1989 | Park et al. | 216/60 |
| 4,871,943 A | * | 10/1989 | Eschard | 313/526 |
| 5,017,755 A | * | 5/1991 | Yahagi et al. | 219/121.68 |
| 5,365,034 A | * | 11/1994 | Kawamura et al. | 219/121.83 |
| 5,922,225 A | * | 7/1999 | Blake | 219/121.84 |

* cited by examiner

Primary Examiner—Robert H. Kim
Assistant Examiner—Allen C Ho
(74) Attorney, Agent, or Firm—Penny A. Clarke; Patrick K. Patnode

(57) ABSTRACT

A photomultiplier tube includes dynodes electrically joined to corresponding leads. The tube, containing a loose debris particle, may be reprocessed by positioning the particle at an accessible site inside the tube. A power laser is aimed at the particle through a transparent wall of the tube and fired to reduce the size of the particle.

32 Claims, 2 Drawing Sheets

PHOTOMULTIPLIER TUBE REPROCESSING

BACKGROUND OF THE INVENTION

This invention relates to photomultiplier tubes, and, more particularly, to the processing thereof during original manufacture.

A photomultiplier tube (PMT) is an extremely sensitive detector of light and other radiation and has many uses in commercial applications. The PMT is in the form of a glass vacuum tube in which electrons released by radiation and striking a photocathode in the tube are accelerated for greatly amplifying the signal obtained from small quantities of radiation.

The photocathode of the PMT is located at its distal end, with the opposite proximal end of the photocathode having exposed ends of multiple electrical leads which extend into the evacuated tube. Also disposed inside the tube is an anode which cooperates with the photocathode. Focusing electrodes and many dynodes within the tube also cooperate with the photocathode. The dynodes are electrodes specifically configured for emission of secondary electrons which multiply the photoelectrons emitted from the photocathode upon bombardment with incident light or radiation.

The various internal components of the PMT are suitably supported on a ceramic substrate for example, with the electrical leads extending through a significant portion of the length of the tube from the respective dynodes and other electrodes through the proximal end of the tube for being connected into the corresponding electrical device in which they may be used.

For example, one application of the PMT is in a positron emission tomography (PET) scanner for medical diagnostic applications, such as detecting tumors. Many other applications of PMTs are found in scientific, medical, and commercial endeavors.

PMTs are manufactured by assembling together the internal components, inserting this subassembly core into the enclosing glass tube, and then permanently sealing the glass tube shut by fusing the glass tube to the glass base through which the electrical leads extend. The glass base typically includes a center tube through which the assembled tube is evacuated to a sufficient level of vacuum, with the tube then being sealed shut.

The PMT is then inspected for any defects which would render it inoperable for its intended use. For example, during initial manufacture of the subassembly core the individual dynodes are typically resistance-welded to the ends of the corresponding electrical leads. In the process of resistance welding, fine whiskers of weld material may be formed at the welded joints. These metal whiskers may break during the process of inserting the core into the enclosing glass tube, and be liberated in the tube.

Furthermore, small particles of ceramic substrate or other materials of the PMT core may also be liberated during the manufacturing process. Fabric fibers and hair from manufacturing workers may even be found inside the evacuated tubes notwithstanding normal precautions taken during the manufacturing process for ensuring clean assembly of the various components.

Since the PMT is evacuated and operated at high voltage during use, these loose debris particles or contaminants may adversely affect the performance of the PMT or substantially reduce its useful life.

Inspection of the manufactured tubes may reveal relatively large particles that are equal to or greater than 0.2 mm in length and thus deemed unacceptable for meeting the desired performance and life specifications for the PMT. In particular, liberation of the weld metal whiskers is a significant concern, and improved welding techniques are being investigated for reducing the occurrence of this one type of particle in the manufactured PMT.

Weld metal whiskers constitute the majority of undesirable debris particles typically found in the manufacture of PMTs, and their reduction or elimination can substantially reduce the defect rate. Since the glass tube of the PMT is fused shut under vacuum during the manufacturing process, it is impossible to physically remove any undesirable debris therein, and defective PMTs must then be scrapped at a corresponding substantial cost.

Accordingly, it is desired to provide a method of processing PMTs during the manufacturing process for reducing defects due to debris particles in the PMTs.

BRIEF SUMMARY OF THE INVENTION

A photomultiplier tube includes dynodes electrically joined to corresponding leads. The tube may be reprocessed by positioning a liberated debris particle at an accessible site inside the tube. A power laser is aimed at the particle through the wall of the tube and fired for reducing the size of the particle.

DETAILED DESCRIPTION OF THE INVENTION

Figure 1:
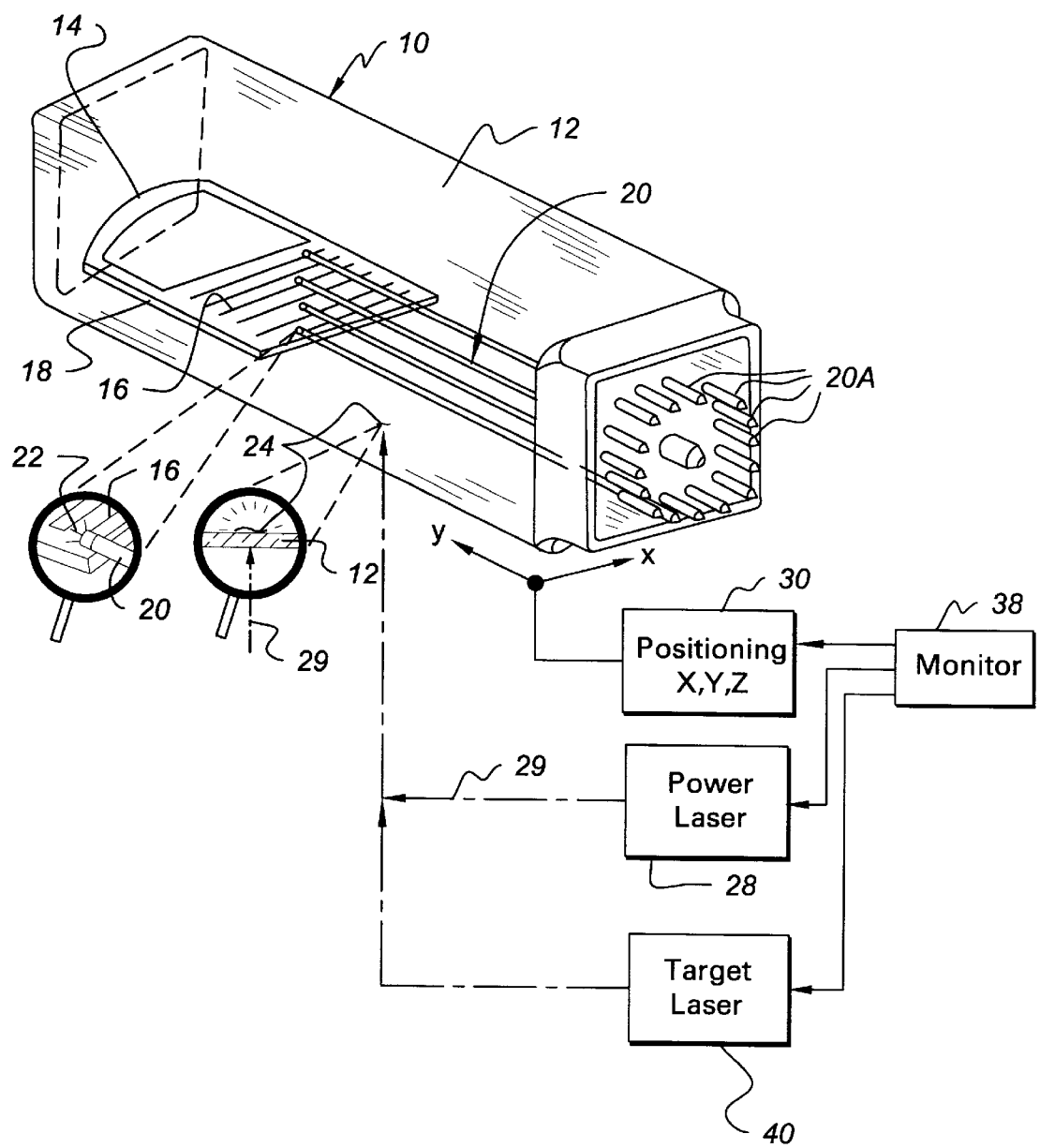
FIG. 1 is a schematic representation of a photomultiplier tube and method of reprocessing thereof in accordance with an exemplary embodiment of the invention.

Illustrated schematically in FIG. 1 is a photomultiplier tube (PMT) 10 which may have any conventional configuration. For example, the tube is typically formed of an enclosing wall 12 comprised of a clear glass or other optically transparent material. Within the tube its core elements are suitably mounted. These elements include a photocathode 14 configured for receiving incident light or radiation, and from which photoelectrons are directed inside the tube. A plurality of dynodes 16 are suitably mounted on a supporting substrate 18, which may be ceramic for example.

Each of the dynodes is electrically joined to a corresponding electrical lead 20 which extends inside the glass tube and through the base thereof for being exposed as external pins 20A which are mounted in a corresponding socket of any suitable electrical apparatus in which the PMT may be used. For example, the PMT may be configured for use in the PET scanner identified above, or in any other suitable application.

Tube 10 includes various other conventional components not shown in FIG. 1, such as focusing electrodes and an anode which cooperate with the photocathode and the dynodes during operation. The photocathode is typically located at the distal end of the tube, and photoelectrons are directed toward the proximal end of the tube from which the lead pins extend. The photoelectrons are focused by the focusing electrodes and multiplied by the several dynodes, which all occurs under high vacuum and relatively high voltage during operation.

Illustrated schematically in FIG. 1 is an exemplary step in the manufacturing process of PMT 10 in which each individual electrical lead 20 is resistance welded to a corresponding dynode 16 to form an electrical joint therewith. This welding occurs prior to positioning the core elements inside the separately manufactured glass tube. As indicated above, resistance welding can form minute metal whiskers 22 at the weld joints, which are initially securely held by the joints, after welding.

The core elements are then positioned inside the tube and hermetically sealed therein with a corresponding vacuum established inside the tube. During the positioning process, the whiskers or portions thereof may be broken free and liberated as one type of debris particle 24 which, if sufficiently large, may adversely affect performance of the PMT or degrade its useful life.

As indicated above, debris particle 24 may be a metal whisker liberated from the welded joints, or may be any other type of liberated or otherwise loose debris which may be found inside the sealed tube during the manufacture process. Notwithstanding the existence of liberated or loose debris particles inside the sealed PMT 10, this invention allows effective repair of this condition without opening the sealed tube, substantially reducing the defect rate thereof and corresponding scrapping.

Figure 2:
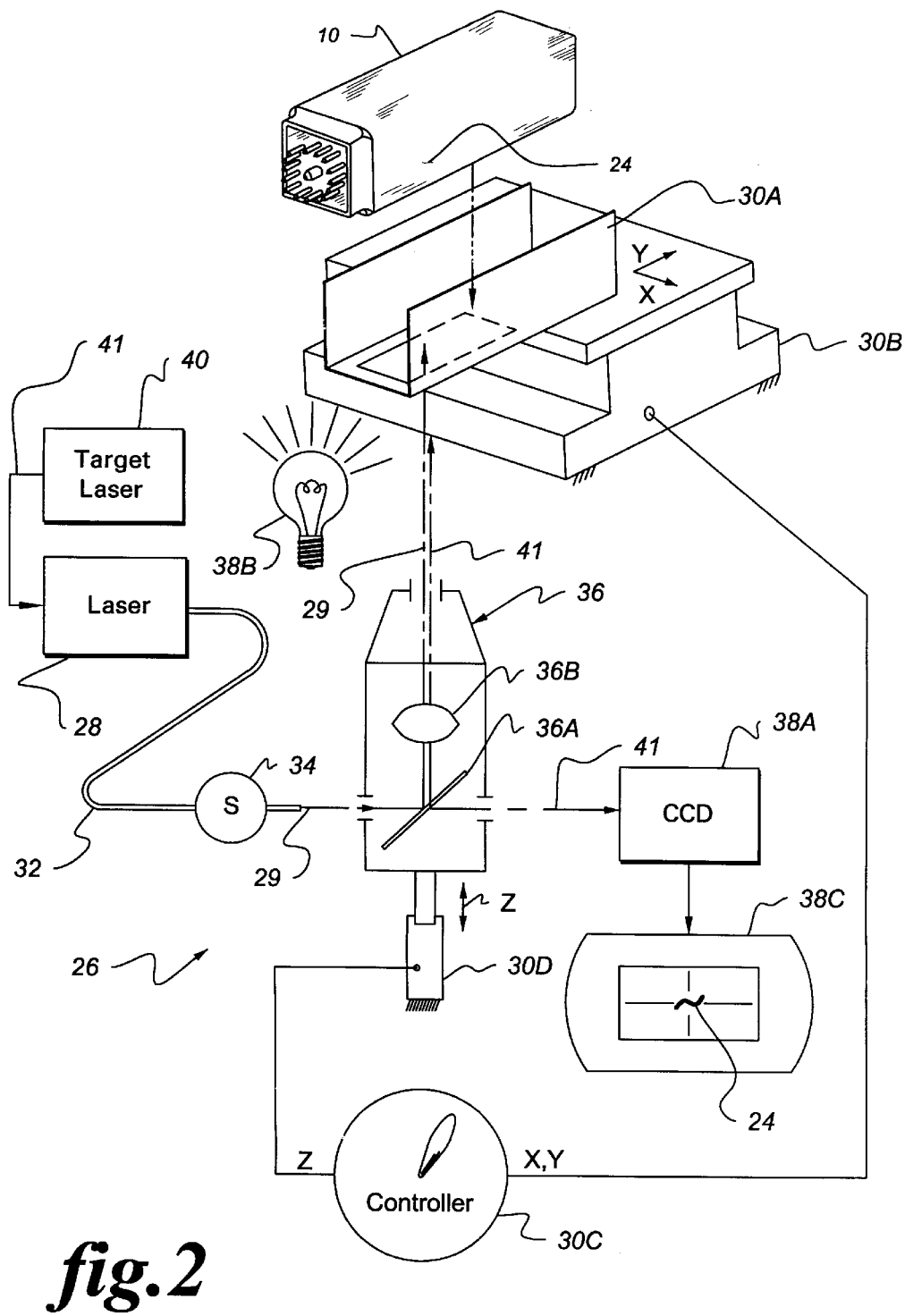
FIG. 2 is a schematic representation of an apparatus for reprocessing the photomultiplier tube illustrated in FIG. 1 in accordance with an exemplary embodiment of the invention.

While FIG. 1 illustrates a method for repairing photomultiplier tube 10, FIG. 2 illustrates schematically a corresponding apparatus or system 26 specifically configured for implementing the method in accordance with exemplary embodiments of the invention. Initially, tube 10 shown in FIG. 1 is preferably manually inspected and then gently tapped to dislodge or liberate any debris particle 24 therein, with the tapping being effective for positioning the particle at any suitable accessible site or location inside the tube. With the help of a target laser 40, a power laser 28 is then aimed at the particle inside the tube through glass wall 12 of the tube and is fired, emitting a laser power beam 29 at the particle to reduce its size by cutting or vaporizing the particle.

The power laser should have sufficient energy for disintegrating or vaporizing the debris particle. In preferred embodiments, power laser 28 may be a neodymium (Nd):YAG laser having a peak power output of about 5 kilowatts, or about 3 to 5 Joules, operated in pulse mode, with pulse lengths in the exemplary range of about 0.1–2.0 milliseconds. In an alternative embodiment, the power laser may be a Nd:glass laser of any suitable configuration.

A particular advantage of the Nd:YAG laser is that the 1060 nanometer wavelength of its optical beam will readily pass through the glass wall of tube 10 without damage to the wall, and deliver its energy to the intended debris particle target. In this way, the energy from the power beam may be locally concentrated in the debris particle itself, which is cut or vaporized to reduce its effective size.

Debris particles less than about 0.2 milimeters in length are deemed acceptable for proper performance of PMT 10, and power laser 28 may be effectively utilized for correspondingly reducing the size of any debris particle found in the tube, thus repairing the tube during its original manufacture and avoiding the necessity of scrapping the tube.

Since the targeted debris particle may vaporize as well as undergo size reduction, liberated vapors of the particle may adversely affect performance of the operative components of the tube, including dynodes 16, for example. Accordingly, tube 10 is preferably gently tapped to also initially position the debris particle away from the several dynodes 16 in any available accessible site, typically adjacent internal electrical leads which extend from the corresponding dynodes and other electrodes of the PMT.

After tapping debris particle 24, illustrated in FIG. 1, is suitably positioned mid-way between the dynodes and the base end of the tube through which leads 20 enter the tube. Depending upon the specific configuration of PMT 10, electrical leads 20 generally extend in a large group, for example about sixteen leads which are typically straight or angled, to reach the respective electrodes. Accordingly, the various electrodes, including the dynodes, are located in most part remotely from the majority of the leads. In this way, the array of electrical leads provides a suitable location remote from the various electrodes, where the debris particle may be positioned for laser bombardment.

As illustrated in FIG. 1, tube 10 is supported to position particle 24 stationary atop the inner surface of the bottom wall 12 of the tube under the influence of gravity. Power laser 28 may then be fired upwardly through the bottom wall of the glass tube to bombard the particle with the power beam. In this way, the power beam need only pass through the single bottom wall of the glass tube to directly bombard particle 24. Any liberated vapor from the targeted particle may then be locally confined to the vicinity of electrical leads 20 remotely from the electrodes inside the sealed tube.

The laser beam may be aimed at particle 24 in various manners. For example, the aiming point or spot of power laser 28 inside tube 10 may be suitably monitored by monitoring means 38. Additionally, positioning means 30 allows the position of the tube itself to be suitably adjusted in space relative to the aiming spot of the power beam to align the aiming spot upon particle 24 prior to firing the laser.

Illustrated schematically in FIG. 2 is a preferred form of means for adjusting the position of tube 10 so that the power beam is correctly aimed. These adjusting means include a fixture or cradle 30A mounted atop a two-axis translation carriage or stage 30B which may be operatively controlled by a suitable electrical controller 30C.

Cradle 30A may be U-shaped for securely supporting PMT 10 when the PMT is placed therein. The cradle includes a downwardly facing aperture directly exposing a portion of tube 10 through which power beam 29 may be directed. Controller 30C may be configured with a joystick for controlling the translation of carriage 30B in two orthogonal directions X,Y for correspondingly translating tube 10 when the tube is supported in the cradle.

Power laser beam 29 may be optically aligned with tube 10 in any suitable manner. In the preferred embodiment illustrated in FIG. 2, a flexible fiber optic cable 32 is operatively joined to the laser for carrying power beam 29. A mechanical shutter 34 is used to block emission of the pulse laser beam until tube 10 is properly aligned.

The distal end of fiber cable 32 is optically joined to an output coupler 36 which includes a multiple layer dichroic mirror 36A optically aligned with the power laser beam from the distal end of cable 32. Mirror 36A is also optically aligned with the aperture through cradle 30A for correspondingly aligning the power beam with tube 10 supported in the cradle.

A focusing lens 36B is also part of the coupler and is optically aligned between mirror 36A and the cradle supporting tube 10.

Output coupler 36 is preferably mounted on a conventional vertical stage or carriage 30D, which in turn is operatively controlled by controller 30C. In this way, the vertical elevation along a Z-axis may be adjusted for correspondingly adjusting the focus spot of the power beam at the particle in the tube supported in the cradle. Focusing lens 36B may have a focal length as short as about 40 mm for efficient energy coupling with debris particle 24 through the glass wall of the tube.

FIG. 2 also illustrates a preferred form of the means for monitoring the aiming spot of the power laser. These means include a photodetector 38A in the preferred form of a charged coupled device (CCD) optically aligned with dichroic mirror 36A. A simple light source 38B may be located below cradle 30A for illuminating the debris particle inside the tube for providing sufficient light which is carried backward to dichroic mirror 36A where it is refracted by the mirror layers for detection by photodetector 38A. The photodetector is preferably operatively joined to a display monitor 38C, which may be a cathode ray tube (CRT), for viewing the aiming spot of the power laser. Monitor 38C may have suitable cross-hairs displayed therein which are pre-aligned with the aiming spot of the power laser.

Translation carriage 30B may be translated along its two axes X,Y to adjust the position of the supported tube 10 until the desired particle 24 is situated within the cross-hairs of monitor 38C indicating proper alignment with the laser power beam. This beam may then be fired to impact the particle.

As shown in FIG. 2, target laser 40 is used in conjunction with power laser 28 for aligning and aiming the power beam at particle 24. The target laser is configured to emit a visible laser target beam 41 coincident or aligned with power beam 29 carried through fiber cable 32 and directed at particle 24. A suitable target laser may be a low power HeNe laser having a visible wavelength of about 632 nanometers.

Since photodetector 38A is aligned with dichroic mirror 36A, it is therefore optically aligned with both the power and target laser beams 29 and 41, and is effective for monitoring the visible target beam when the beam is projected inside PMT 10 to facilitate aiming of the power laser at the particle.

While power laser 28 is initially off, target laser 40 may be operated for emitting visible target beam 41 along the same optical path as that of the laser power beam through optical coupler 36 and cradle 30A at tube 10 supported in the cradle. Return light from tube 10 travels to dichroic mirror 36A where it is refracted by the multiple layers of mirror 36A so as to be detected by detector 38A and displayed on monitor 38C.

In this way, carriage 30B may be operated to align the visible target beam 41 with the intended target particle 24 as viewed in monitor 42. Upon proper alignment and targeting, power laser 28 may be operated and shutter 34 opened for delivering one or more pulses of laser power beam 29 to particle 24 for cutting or vaporizing the particle.

Development testing of the reprocessing method and apparatus illustrated in FIGS. 1 and 2 has demonstrated the efficacy of the invention. A debris particle, such as a metal whisker, has been vaporized and effectively reduced in size to less than about 0.2 millimeters, with the resulting reprocessed photomultiplier tube 10 being operable for its intended purpose under high voltage without adverse affect. Depending upon the size and location of the vaporized particle, the vapor remains of the particle may be deposited upon operative components of the PMT, degrading performance. Nevertheless, the reprocessing procedure described herein may be used for reprocessing debris-containing photomultiplier tubes which would otherwise require scrapping after completion of the manufacturing process. The efficacy of reprocessing may be determined for each particular configuration of photomultiplier tube including the specific material composition of the debris particles contained in the tubes and their initial size. The accessible sites for destroying the debris particles should preferably be located remotely from the operative electrodes of the tube and may be optimized based on the specific configuration of the PMT.

Photomultiplier tubes reprocessed in this manner may then be tested to ensure their conformance with required performance specifications, with successfully reprocessed PMTs being made available for use and thus eliminating the need for scrapping such tubes.

While only certain preferred features of the invention have been illustrated and described, many modifications and changes will occur to those skilled in the art. For example, the invention is not limited to photomultiplier tubes, but is applicable to any hermetically sealed device that may be adversely affected by presence of a small, loose particle therein, and having a transparent wall that will allow passage of coherent light into the device. It is, therefore, to be understood that the appended claims are intended to cover all such modifications and changes as fall within the true spirit of the invention.

What is claimed is:

1. A method for reprocessing a photomultiplier tube including a plurality of dynodes electrically joined to corresponding leads, comprising:
    tapping said tube to position a debris particle at an accessible site therein;
    aiming a power laser at said particle through an optically transparent wall of said tube; and
    firing a laser power beam from said laser at said particle to reduce the size of said particle.

2. A method according to claim 1 wherein said tube is tapped to position said particle away from said dynodes in an accessible site adjacent said leads and mid-way between the dynodes and the base end of tube.

3. A method according to claim 2 further comprising:
    supporting said tube to position said particle atop the inner surface of a bottom transparent wall of said tube; and
    firing said power laser upwardly through said bottom wall to strike said particle with said power beam.

4. A method according to claim 2 further comprising:
    monitoring an aiming spot of said power laser inside said tube; and
    adjusting position of said tube relative to said aiming spot to align said aiming spot with said particle.

5. A method according to claim 2 further comprising aiming a target laser to emit a visible laser target beam coincident with said power beam at said particle.

6. A method according to claim 5 further comprising monitoring said visible target beam inside said tube to aim said power laser at said particle.

7. A method according to claim 2 wherein said tube includes a base end and said accessible site adjacent said leads is located mid-way between the dynodes and the base end of the tube.

8. A method for reprocessing a photomultiplier tube including a plurality of dynodes electrically joined to corresponding leads, comprising:
    tapping said tube to position a debris particle at an accessible site therein;
    aiming a power laser at said particle through an optically transparent wall of said tube;
    monitoring an aiming spot of said power laser inside said tube;
    adjusting position of said tube relative to said aiming spot to align said aiming spot with said particle;

supporting said tube to position said particle stationary atop the inner surface of a transparent bottom wall of said tube; and firing a laser power beam from said laser at said particle upwardly through said bottom wall to reduce the size of said particle.

9. A method according to claim 8 further comprising aiming a target laser to emit a visible laser target beam coincident with said power beam at said particle.

10. A method according to claim 9 further comprising monitoring location of said visible target beam inside said tube to facilitate said aiming of said power laser at said particle.

11. A method according to claim 10 wherein the step of tapping said tube is performed to position said particle mid-way between said dynodes and a base end of said tube at an accessible site adjacent said leads and mid-way between the dynodes and the base end of the tube.

12. An apparatus for reprocessing a photomultiplier tube containing a plurality of dynodes electrically joined to corresponding leads, comprising:

means for aiming a laser power beam at a particle through an optically transparent wall of said tube;

a power laser for firing said laser power beam at said particle to reduce the size of said particle; and a target laser, which is configured to emit a visible laser target beam at said particle, the visible laser target beam being aligned with said laser power beam and configured for facilitating aligning said laser power beam at said particle.

13. An apparatus according to claim 12 further comprising:

means for monitoring an aiming spot of said power laser inside said tube; and means for adjusting position of said tube relative to said aiming spot to align said aiming spot upon said particle.

14. An apparatus for reprocessing a photomultiplier tube containing a plurality of dynodes electrically joined to corresponding leads, said apparatus comprising:

means for aiming a laser power beam at a particle through an optically transparent wall of said tube;

a power laser for firing said laser power beam at a particle through an optically transparent wall of said tube to reduce the size of said particle;

means for monitoring an aiming spot of said power laser inside said tube; and means for adjusting the position of said tube relative to said aiming spot to align said aiming spot upon said particle, said adjusting means comprising a cradle for supporting said tube to position said particle atop the inner surface of a bottom transparent wall of said tube, said laser power beam being aimed upwardly through said bottom wall to strike said particle with said power beam.

15. An apparatus according to claim 14 further comprising a target laser aimed with said power laser to emit a visible laser target beam coincident. with said laser power beam at said particle.

16. An apparatus according to claim 15 wherein said monitoring means comprise a photodetector optically aligned with both said laser power beam and said laser target beam for monitoring said laser target beam inside said tube and thereby facilitate aiming of said power laser beam at said particle.

17. An apparatus according to claim 16 further comprising:

a dichroic mirror optically aligned with said power laser, said photodetector, and said tube; and a focusing lens optically aligned between said dichroic mirror and said tube.

18. A method for reprocessing a hermetically sealed electronic device containing welded apparatus, wherein presence of a loose debris particle within said device can be detrimental to operation of said device, said method comprising:

tapping said device to position a debris particle at an accessible site therein;

aiming a power laser at said particle through an optically transparent wall of said device; and firing a laser power beam from said laser at said particle to reduce the size of said particle.

19. A method according to claim 18 wherein said tube is tapped to position said particle away from said apparatus in said device but in a site accessible to said laser power beam.

20. A method according to claim 19 further comprising:

monitoring an aiming spot of said power laser inside said device; and adjusting position of said device relative to said aiming spot to align said aiming spot with said particle.

21. A method according to claim 19 further comprising aiming a target laser to emit a visible laser target beam coincident with said power beam at said particle.

22. A method according to claim 21 further comprising monitoring said visible target beam inside said tube to aim said power laser at said particle.

23. A method according to claim 19 where said electronic device includes a base end and said site accessible to said laser power beam is located mid-way between said apparatus and said base end of the device.

24. A method for reprocessing a hermetically sealed electronic device wherein presence of a loose debris particle in said device can be detrimental to device operation, said method comprising:

tapping said device to position a debris particle at an accessible site therein;

aiming a power laser at said particle through an optically transparent wall of said device;

monitoring an aiming spot of said power laser inside said device;

adjusting position of said device relative to said aiming spot to align said aiming spot with said particle;

supporting said device to position said particle stationary atop the inner surface of a bottom transparent wall of said device; and firing a laser power beam from said laser at said particle upwardly through said bottom wall to reduce the size of said particle.

25. A method according to claim 24 further comprising aiming a target laser to emit a visible laser target beam coincident with said power beam at said particle.

26. A method according to claim 25 further comprising monitoring said visible target beam inside said tube to aim said power laser at said particle.

27. An apparatus for reprocessing a hermetically sealed electronic device, wherein presence of a loose debris particle in said device can be detrimental to device operation, said apparatus comprising:

means for aiming a laser power beam at said particle through an optically transparent wall of said device;

a power laser for firing said laser power beam at said particle to reduce the size of said particle; and a target laser, which is configured to emit a visible laser target beam at said particle, the visible laser target beam being aligned with said laser power beam and configured for facilitating aligning said laser power beam at said particle.

28. An apparatus according to claim 27 further comprising:

means for monitoring an aiming spot of said power laser inside said device; and means for adjusting position of said device relative to said aiming spot to align said aiming spot upon said particle.

29. An apparatus for reprocessing a hermetically sealed electronic device, wherein presence of a loose debris particle in said device can be detrimental to device operation, said apparatus comprising:

means for aiming a laser power beam at said particle through an optically transparent wall of said device;

a power laser for firing said laser power beam at said particle to reduce the size of said particle;

means for monitoring an aiming spot of said power laser inside said device; and means for adjusting the position of said device relative to said aiming spot to align said aiming spot upon said particle, said adjusting means comprising a cradle for supporting said device to position said particle atop the inner surface of a bottom transparent wall of said device, said laser power beam being aimed upwardly through said bottom wall to strike said particle with said power beam.

30. An apparatus according to claim 29 further comprising a target laser aimed with said power laser to emit a visible laser target beam coincident with said laser power beam at said particle.

31. An apparatus according to claim 30 wherein said monitoring means comprise a photodetector optically aligned with both said laser power beam and said laser target beam for monitoring said visible laser target beam inside said device and thereby facilitating aiming of said power laser beam at said particle.

32. An apparatus according to claim 30 further comprising:

a dichroic mirror optically aligned with said power laser, said photodetector, and said device; and a focusing lens optically aligned between said dichroic mirror and said device.

* * * * *